(12) United States Patent
Lee et al.

(10) Patent No.: US 10,582,257 B2
(45) Date of Patent: Mar. 3, 2020

(54) SERVER, IMAGE DISPLAY APPARATUS, AND METHOD OF OPERATING THE IMAGE DISPLAY APPARATUS

(71) Applicant: SAMSUNG ELECTRONICS CO., LTD., Suwon-si, Gyeonggi-do (KR)

(72) Inventors: Dong-gu Lee, Suwon-si (KR); Yeon-woo Kim, Seongnam-si (KR); Young-jin Lee, Suwon-si (KR); Jae-hyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 15/441,395

(22) Filed: Feb. 24, 2017

(65) Prior Publication Data

US 2017/0251243 A1 Aug. 31, 2017

(30) Foreign Application Priority Data

Feb. 26, 2016 (KR) .................. 10-2016-0023634
Jun. 15, 2016 (KR) .................. 10-2016-0074728

(51) Int. Cl.
*H04N 21/438* (2011.01)
*H04N 21/462* (2011.01)
*H04N 21/426* (2011.01)

(52) U.S. Cl.
CPC ..... *H04N 21/4384* (2013.01); *H04N 21/4263* (2013.01); *H04N 21/4622* (2013.01)

(58) Field of Classification Search
CPC ........... H04N 21/4384; H04N 21/4622; H04N 21/4263; H04N 21/4524; H04N 21/4383
See application file for complete search history.

(56) References Cited

U.S. PATENT DOCUMENTS

| 8,166,502 B2 | 4/2012 | Hsiao |
| 2005/0036073 A1 | 2/2005 | Bae et al. |
| 2007/0039026 A1 | 2/2007 | Yoon et al. |

(Continued)

FOREIGN PATENT DOCUMENTS

KR 10-2014-0102061 8/2014

OTHER PUBLICATIONS

International Search Report dated Jun. 2, 2017, in corresponding International Patent Application No. PCT/KR2017/002054.

(Continued)

*Primary Examiner* — Benjamin R Bruckart
*Assistant Examiner* — Akshay Doshi
(74) *Attorney, Agent, or Firm* — Staas & Halsey LLP

(57) ABSTRACT

Provided is an image display apparatus including: a communicator configured to receive, from a server, information about an integrated frequency band corresponding to a region where the image display apparatus is located; a display; a processor; a memory; and at least one program stored in the memory and executed by the processor, wherein the at least one program comprises instructions for scanning channels included in the integrated frequency band for a channel receivable by the image display apparatus, and displaying a result of the scanning on the display, and the integrated frequency band is a frequency band determined based on frequency bands receivable by other image display apparatuses located in the same region as the image display apparatus.

18 Claims, 11 Drawing Sheets

(56) References Cited

U.S. PATENT DOCUMENTS

| | | | | |
|---|---|---|---|---|
| 2010/0169919 A1* | 7/2010 | Du Breuil | ............... | H04N 5/50 |
| | | | | 725/39 |
| 2010/0211978 A1 | 8/2010 | Hsiao | | |
| 2011/0051012 A1 | 3/2011 | Miyazaki | | |
| 2013/0141650 A1* | 6/2013 | Jeong | ...................... | H04N 5/50 |
| | | | | 348/732 |
| 2013/0212617 A1 | 8/2013 | Sato et al. | | |
| 2014/0009688 A1* | 1/2014 | Larsen | .................... | H04N 5/50 |
| | | | | 348/732 |
| 2014/0139748 A1 | 5/2014 | Blanchard et al. | | |
| 2014/0229993 A1 | 8/2014 | Lee et al. | | |
| 2015/0181282 A1 | 6/2015 | Majid et al. | | |

OTHER PUBLICATIONS

International Written Opinion of the International Search Authority dated Jun. 2, 2017, in corresponding International Patent Application No. PCT/KR2017/002054.

International Notification of Transmittal of the International Search Report and Written Opinion of the International Search Authority, or the Declaration dated Jun. 2, 2017, in corresponding International Patent Application No. PCT/KR2017/002054.

Extended European Search Report dated Aug. 3, 2018 in corresponding European Patent Application No. 17756856.5.

\* cited by examiner

SERVER, IMAGE DISPLAY APPARATUS, AND METHOD OF OPERATING THE IMAGE DISPLAY APPARATUS

CROSS-REFERENCE TO RELATED APPLICATION

This application claims the benefit of Korean Patent Application No. 10-2016-0023634, filed on Feb. 26, 2016, and Korean patent Application No. 10-2016-0074728, filed on Jun. 15, 2016, in the Korean Intellectual Property Office, the disclosures of which are incorporated herein in their entirety by reference.

BACKGROUND

1. Field

The present disclosure relates to a server, an image display apparatus, and a method of operating the image display apparatus, and more particularly, to a server, an image display apparatus, and a method of operating the image display apparatus, whereby a channel scan speed is increased during an automatic channel scan.

2. Description of the Related Art

An image display apparatus is an apparatus having a function of displaying an image viewable by a user. The user may watch broadcasting through the image display apparatus. The image display apparatus displays, on a display, broadcasting selected by the user from among broadcasting signals transmitted from broadcasting stations.

Also, a smart television (TV) providing various types of content in addition to broadcasting has become widely available. The smart TV aims to analyze and provide content desired by a user without manipulation by the user, instead of being manually operated according to selection by the user.

Meanwhile, the image display apparatus provides an automatic channel scan function. The automatic channel scan function is a function of scanning a pre-set frequency band for a receivable channel and providing the available channel. However, even when a frequency band, which is actually available according to regions and broadcasters, is different from the pre-set frequency band, all channels are scanned in the pre-set frequency band, and thus, it takes too long to find the receivable channel.

SUMMARY

Provided are a server for providing integrated frequency band information according to regions, an image display apparatus for reducing a channel scan time by performing a channel scan based on the integrated frequency band information, and a method of operating the image display apparatus.

Additional aspects will be set forth in part in the description which follows and, in part, will be apparent from the description, or may be learned by practice of the presented embodiments.

According to an aspect of an embodiment, an image display apparatus includes: a communicator configured to receive, from a server, information about an integrated frequency band corresponding to a region where the image display apparatus is located; a display; a processor; a memory; and at least one program stored in the memory and executed by the processor, wherein the at least one program comprises instructions for scanning channels included in the integrated frequency band for a channel receivable by the image display apparatus, and displaying a result of the scanning on the display, and the integrated frequency band is a frequency band determined based on frequency bands receivable by other image display apparatuses located in the same region as the image display apparatus.

According to an aspect of another embodiment, a method of operating an image display apparatus, the method includes: receiving, from a server, information about an integrated frequency band corresponding to a region where the image display apparatus is located; scanning channels included in the integrated frequency band for a channel receivable by the image display apparatus; and displaying a result of the scanning, wherein the integrated frequency band is a frequency band determined based on frequency bands receivable by other image display apparatuses located in the same region as the image display apparatus.

According to an aspect of another embodiment, a server includes: a communicator configured to receive first frequency band information corresponding to channels receivable by a first image display apparatus and second frequency band information corresponding to channels receivable by a second image display apparatus, wherein the first and second image display apparatuses are located in a same region; a processor; a memory; and at least one program stored in the memory and executed by the processor, wherein the at least one program comprises instructions for generating integrated frequency band information corresponding to the same region based on the first frequency band information and the second frequency band information, storing the integrated frequency band information, and transmitting the integrated frequency band information to a third image display apparatus located in the same region.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
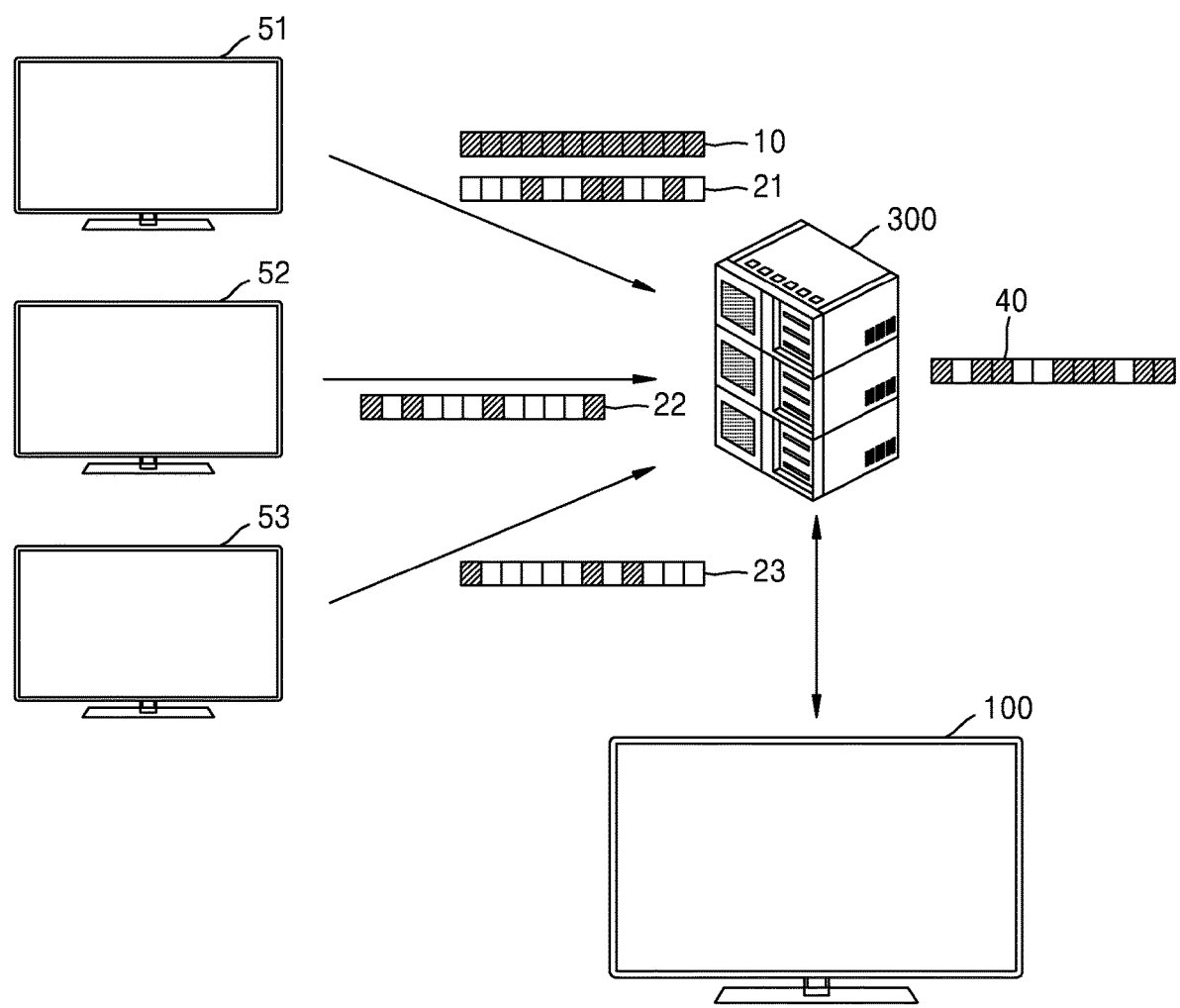
FIG. 1 is a diagram of an image display apparatus and a server, according to an embodiment.

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to an intention of one of those of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

As used herein, the term "and/or" includes any and all combinations of one or more of the associated listed items. Expressions such as "at least one of," when preceding a list of elements, modify the entire list of elements and do not modify the individual elements of the list.

One or more embodiments of the present disclosure will now be described more fully with reference to the accompanying drawings. However, the one or more embodiments of the present disclosure may be embodied in many different forms, and should not be construed as being limited to the embodiments set forth herein; rather, these embodiments are provided so that this disclosure will be thorough and complete, and will fully convey the concept of the one or more embodiments of the present disclosure to those of ordinary skill in the art. In the following description, well-known functions or constructions are not described in detail since they would obscure the one or more embodiments of the present disclosure with unnecessary detail, and like reference numerals in the drawings denote like or similar elements throughout the specification.

FIG. 1 is a diagram of an image display apparatus 100 and a server 300, according to an embodiment.

As shown in FIG. 1, the image display apparatus 100 may be a television (TV), but is not limited thereto, and may be an electronic apparatus capable of receiving a broadcast signal and displaying an image based on the broadcast signal. For example, the image display apparatus 100 may be any one of various electronic apparatuses, such as a mobile phone, a tablet personal computer (PC), a digital camera, a camcorder, a laptop computer, a desktop computer, an electronic book, a digital broadcasting terminal, a personal digital assistant (PDA), a portable multimedia player (PMP), navigation device, an MP3 player, and a wearable device. In particular, the image display apparatus 100 may be a display apparatus having a large display, such as a TV, but is not limited thereto.

Also, the image display apparatus 100 may be a fixed type or a movable type, and may be a digital broadcast receiver capable of receiving a digital broadcast. Also, the image display apparatus 100 may not only be a flat display apparatus, but also a curved display apparatus in which a screen has a curvature, or a flexible display apparatus in which a screen has an adjustable curvature. An output resolution of the image display apparatus 100 may be high definition (HD), full HD, ultra HD, or a resolution clearer than ultra HD.

Meanwhile, the term "user" herein denotes a person controlling a function or operation of the image display apparatus 100 by using a control apparatus, and may be a viewer, a manager, or an installation engineer.

The image display apparatus 100 according to an embodiment may communicate with the server 300 through a wired/wireless network. The image display apparatus 100 may transmit region information to the server 300, and request the server 300 for integrated frequency band information according to the region information.

The integrated frequency band information according to an embodiment may be frequency information generated based on frequency band information corresponding to channels receivable by each of a plurality of image display apparatuses located in the same region as the image display apparatus 100. For example, the server 300 may receive frequency band information corresponding to channels receivable by each of a plurality of image display apparatuses, from the plurality of image display apparatuses.

In FIG. 1, for convenience of description, the plurality of image display apparatuses include a first image display apparatus 51, a second image display apparatus 52, and a third image display apparatus 53. Also, the plurality of image display apparatuses may include the image display apparatus 100.

Also, for convenience of description, a whole frequency band 10 set in a region where the plurality of image display apparatuses, i.e. the image display apparatus 100 and the first through third image display apparatuses 51 through 53, are located includes frequency bands corresponding to channel 1 through channel 12.

The server 300 may receive information about a first frequency band 21 (first frequency band information) corresponding to channels receivable by the first image display apparatus 51, from the first image display apparatus 51. Here, the first frequency band 21 may include a frequency band corresponding to channels actually receivable by the first image display apparatus 51 from the whole frequency band 10. For example, the channels receivable by the first image display apparatus 51 may be the channels 4, 7, 8, and 11, and the first frequency band 21 may include frequency bands corresponding to the channels 4, 7, 8, and 11 (in the first frequency band 21 in FIG. 1, shaded regions indicate frequency bands corresponding to actually receivable channels).

Also, the server 300 may receive information about a second frequency band 22 (second frequency band information) corresponding to channels receivable by the second image display apparatus 52, from the second image display apparatus 52. For example, the channels receivable by the second image display apparatus 52 may be the channels 1, 3, 7, and 12, and the second frequency band 22 may include frequency bands corresponding to the channels 1, 3, 7, and 12.

Also, the server 300 may receive information about a third frequency band 23 (third frequency band information) corresponding to channels receivable by the third image display apparatus 53, from the third image display apparatus 53. For example, the channels receivable by the third image display apparatus 53 may be the channels 1, 7, and 9, and the third frequency band 23 may include frequency bands corresponding to the channels 1, 7, and 8.

The server 300 according to an embodiment may generate information about an integrated frequency band 40 (integrated frequency band information) corresponding to the region where the plurality of image display apparatuses are located, by integrating the first through third frequency band information. For example, the integrated frequency band 40 may include frequency bands corresponding to the channels 1, 3, 4, 7, 8, 9, 11, and 12, but is not limited thereto.

The server 300 may store the integrated frequency band information, and transmit the integrated frequency band information corresponding to region information of the image display apparatus 100 to the image display apparatus 100.

The image display apparatus 100 according to an embodiment may transmit, to the server 300, the region information about where the image display apparatus 100 is located. Here, the image display apparatus 100 may determine the region where the image display apparatus 100 is located based on an internet protocol (IP) address set in the image display apparatus 100. Alternatively, the image display apparatus 100 may receive a user input (for example, a nation corresponding to the region where the image display apparatus 100 is located), and determine the region where the image display apparatus 100 is located based on the received user input.

The image display apparatus 100 according to an embodiment may perform an automatic channel scan based on the integrated frequency band information received from the server 300. For example, the image display apparatus 100 may perform a channel scan only on the integrated frequency band 40 included in the integrated frequency band information from among the whole frequency band 10 set in the region where the image display apparatus 100 is located. The image display apparatus 100 may selectively scan the broadcast signal corresponding to the integrated frequency band 40 among the whole frequency band 10.

Also, the image display apparatus 100 may perform a channel scan on the whole frequency band 10 set in the region where the image display apparatus 100 is located.

Figure 2:
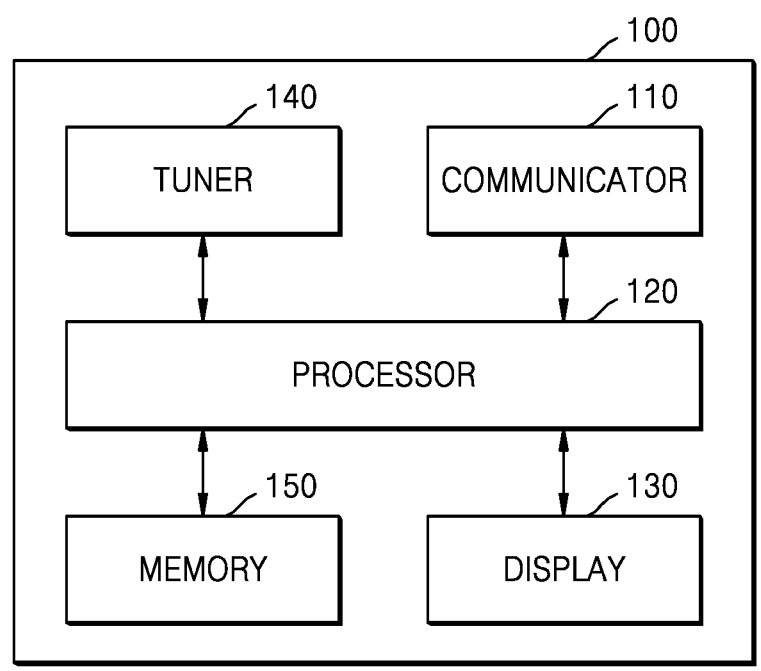
FIG. 2 is a block diagram of an image display apparatus according to an embodiment.

FIG. 2 is a block diagram of the image display apparatus 100 according to an embodiment.

Referring to FIG. 2, the image display apparatus 100 according to an embodiment may include a communicator 110, a processor 120, a memory 150, a tuner 140, and a display 130.

The communicator 110 may transmit and receive data or a signal to and from an external apparatus or a server according to control of the processor 120. The communicator 110 may transmit and receive the data or the signal by using at least one of a wireless local area network (LAN) (for example, Wi-Fi), Bluetooth, wired Ethernet, infrared ray (IR), Bluetooth low energy (BLE), ultrasonic waves, Zigbee, high definition multimedia interface (HDMI), and HDMI-consumer electronics control (CEC), based on a performance and a structure of the image display apparatus 100.

The communicator 110 according to an embodiment may transmit the region information of the image display apparatus 100 to the server 300 and request the server 300 for the integrated frequency band information, according control of the processor 120. Accordingly, the communicator 110 may receive the integrated frequency band information corresponding to the region where the image display apparatus 100 is located, from the server 300.

The tuner 140 may tune and select a frequency of a channel to be received by the image display apparatus 100, from among a plurality of wave components, by performing amplification, mixing, and resonance on a broadcast signal received wirelessly or via wires. The broadcast signal includes audio, video, and additional information (for example, an electronic program guide (EPG)).

The tuner 140 may receive a broadcast signal in a frequency band corresponding to a channel number (for example, a cable broadcast no. 506) according to a user input (for example, a control signal received from a control apparatus, such as a channel number input, a channel up-down input, or a channel input on an EPG screen).

The tuner 140 may receive a broadcast signal from any one of various sources, such as a terrestrial broadcast, a cable broadcast, a satellite broadcast, and an Internet broadcast. The tuner 140 may receive a broadcast signal from a source, such as an analog broadcast or a digital broadcast. The broadcast signal received through the tuner 140 may be decoded (for example, audio-decoded, video-decoded, or additional information-decoded) to be separated into audio, video, and/or additional information. The separated audio, video, and/or additional information may be stored in the image display apparatus 100 according to control of the processor 120.

The tuner 140 according to an embodiment may scan for channels receivable in a frequency band included in the integrated frequency band information corresponding to the region where the image display apparatus 100 is located, according to control of the processor 120. The tuner 140 may selectively scan the broadcast signal corresponding to the integrated frequency band among the whole frequency band set in the region where the image display apparatus 100 is located, according to control of the processor 120.

The processor 120 according to an embodiment may execute at least one program stored in the memory 150. The processor 120 may include a single core, a dual core, a triple core, a quad core, or a multiple core. Also, the processor 120 may include a plurality of processors. For example, the processor 120 may include a main processor (not shown) and a sub-processor (not shown) that operates in a sleep mode.

The memory 150 according to an embodiment may store various types of data, programs, or applications for driving and controlling the image display apparatus 100. The program stored in the memory 150 may include at least one instruction. The program (at least one instruction) or the application stored in the memory 150 may be executed by the processor 120.

The processor 120 according to an embodiment may control the tuner 140 to scan for a channel capable of receiving a broadcast signal from among channels included in the integrated frequency band, during a channel scan in a quick scan mode. Also, the processor 120 may control the tuner 140 to scan for a channel capable of receiving a broadcast signal from among channels included in the whole frequency band set in the region where the image display apparatus 100 is located, during a channel scan in a general scan mode.

The processor 120 according to an embodiment may control the tuner 140 to scan channels in a general scan mode when a region determined based on the IP address set in the image display apparatus 100 and a region determined based on a user input are different.

Also, the processor 120 may control the tuner 140 to first scan a frequency band corresponding to a cable broadcast signal, and scan a frequency band corresponding to a terrestrial broadcast signal when the scanning of the frequency band corresponding to the cable broadcast signal is completed, during a channel scan. Also, the processor 120 may control the tuner 140 to skip scanning of the frequency band corresponding to the terrestrial broadcast signal when the number of receivable channels, from among channels included in the frequency band corresponding to the cable broadcast signal, is equal to or higher than a pre-set number.

Also, the processor 120 may generate channel information about channels capable of receiving a broadcast signal when a channel scan is completed, and control the display 130 to display the channel information. Also, the processor 120 may generate a channel map including the channels when the channel scan is completed, and control the memory 150 to store the channel map. Also, the processor 120 may control the communicator 110 to transmit, to the server 300, information about the frequency band corresponding to the channels receivable by the image display apparatus 100.

The display 130 generates a driving signal by converting an image signal, a data signal, an on-screen display (OSD) signal, or a control signal processed by the processor 120. The display 130 may be a plasma display panel (PDP), a liquid crystal display (LCD), an organic light-emitting device (OLED), or a flexible display, or may be a 3-dimensional (3D) display. Also, the display 130 may be configured as a touch screen to be used not only as an output device, but also as an input device.

The display 130 according to an embodiment may display a channel scan setting screen for selecting any one of a quick scan mode and a general scan mode. Also, the display 130 may display a channel scan result.

Figure 3:
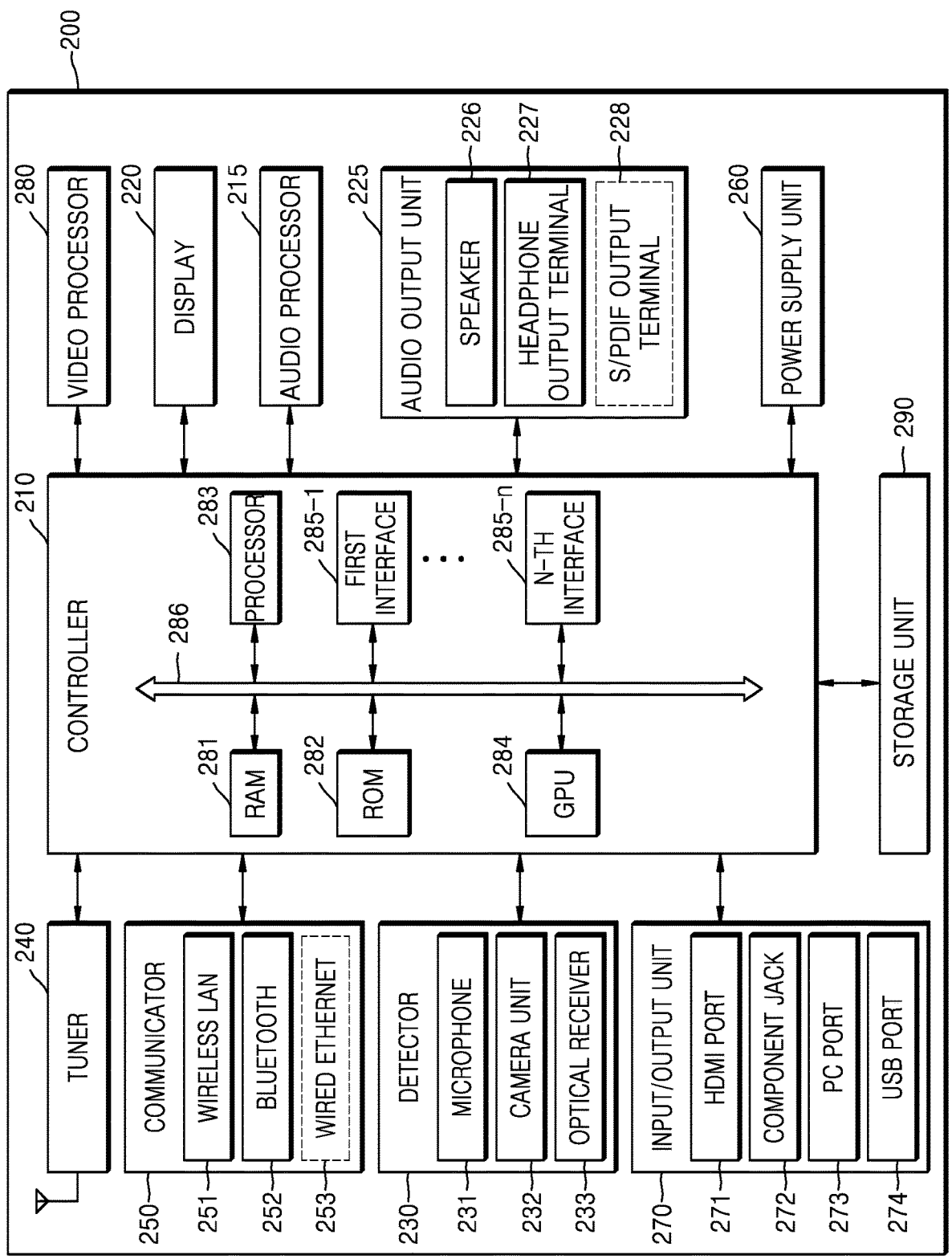
FIG. 3 is a block diagram of an image display apparatus according to another embodiment.

FIG. 3 is a block diagram of an image display apparatus 200 according to another embodiment. The image display apparatus 200 of FIG. 3 may be an embodiment of the image display apparatus 100 of FIG. 1.

Referring to FIG. 3, the image display apparatus 200 according to an embodiment may include a controller 210, a display 220, a communicator 250, and may further include a detector 230, a video processor 280, an audio processor 215, an audio output unit 225, a power supply unit 260, a tuner 240, an input/output unit 270, and a storage unit 290.

The communicator 110 of FIG. 2 may correspond to the communicator 250 of FIG. 3, the tuner 140 of FIG. 2 may correspond to the tuner 240 of FIG. 3, the processor 120 of FIG. 2 may correspond to the controller 210 of FIG. 3, the memory 150 of FIG. 2 may correspond to the storage unit 290 of FIG. 3, and the display 130 of FIG. 2 may correspond to the display 220 of FIG. 3. Details that are same as those described above with reference to FIG. 2 are not provided again in FIG. 3.

The video processor 280 performs a process on video data received by the image display apparatus 200. The video processor 280 may perform, on the video data, various image processes, such as decoding, scaling, noise filtering, frame rate conversion, and resolution conversion.

The display 220 displays, on a screen, video included in a broadcast signal received through the tuner 240, according to control of the controller 210. Also, the display 220 may display content (for example, a video) input through the communicator 250 or the input/output unit 270. The display 220 may output an image stored in the storage unit 290 according to control of the controller 210. Also, the display 220 may display a voice user interface (UI) (for example, including a voice command guide) for performing a voice recognition task corresponding to voice recognition, or a motion UI (for example, including a user motion guide for motion recognition) for performing a motion recognition task corresponding to motion recognition.

The audio processor 215 performs a process on audio data. The audio processor 215 may perform, on the audio data, various processes, such as decoding, amplification, and noise filtering. Meanwhile, the audio processor 215 may include a plurality of audio processing modules to process audio corresponding to a plurality of pieces of content.

The audio output unit 225 outputs audio included in a broadcast signal received through the tuner 240, according to control of the controller 210. The audio output unit 225 may output audio (for example, voice or sound) input through the communicator 250 or the input/output unit 270. Also, the audio output unit 225 may output audio stored in the storage unit 290 according to control of the controller 210. The audio output unit 225 may include at least one of a speaker 226, a headphone output terminal 227, and a Sony/Philips digital interface (S/PDIF) 228. The audio output unit 225b may include a combination of the speaker 226, the headphone output terminal 227, and the S/PDIF output terminal 228.

The power supply unit 260 supplies power received from an external power source to components in the image display apparatus 200, according to control of the controller 210. Also, the power supply unit 260 may supply power output from one or more batteries (not shown) provided inside the image display apparatus 200 to the components according to control of the controller 210.

The image display apparatus 200 may include one or more tuners 240. The tuner 240 may be integrally realized with the image display apparatus 200 or may be realized as a separate apparatus electrically connected to the image display apparatus 200.

The communicator 250 may connect an external apparatus (for example, a peripheral device) to the image display apparatus 200, according to control of the controller 210. The controller 210 may transmit/receive content to and from the external apparatus, download an application from the external apparatus, or perform web-browsing, through the communicator 250. The communicator 250 may include one of a wireless LAN 251, Bluetooth, and wired Ethernet 253 based on a performance and a structure of the image display apparatus 200. Also, the communicator 250 may include a combination of the wireless LAN 251, the Bluetooth 252, and the wired Ethernet 253. The communicator 250 may receive a control signal from an external control apparatus according to control of the controller 210. The control signal may be a Bluetooth type, a radio frequency (RF) signal type, or a Wi-Fi type.

The communicator 250 may further include, in addition to the Bluetooth 252, another short distance communication (for example, near field communication (NFC) or BLE.

The detector 230 detects voice of a user, an image of the user, or an interaction of the user.

A microphone 231 receives voice uttered by the user. The microphone 231 may convert the received voice into an electric signal and output the electric signal to the controller 210. The voice may include, for example, voice corresponding to a menu or function of the image display apparatus 200. The microphone 231 may be integrated with or separated from the image display apparatus 200. When the microphone 231 is separated from the image display apparatus 200, the microphone 231 may be electrically connected to the image display apparatus 200 through the communicator 250 or the input/output unit 270.

It would be obvious to one of ordinary skill in the art that the microphone 231 may be excluded based on a performance and a structure of the image display apparatus 200.

A camera unit 232 receives an image corresponding to motion of the user including a gesture within a camera recognition range (for example, continuous frames). Examples of the motion include motion of a part of a body of the user, such as a face, a face forming an expression, a hand, a hand making a fist, or a finger pointing, or a finger. The camera unit 232 may convert the received image into an electric signal and output the electric signal to the controller 210 according to control of the controller 210.

The controller 210 may select a menu displayed in the image display apparatus 200 or perform a result of recognizing motion, by using the result of recognizing the motion, for example, adjust a channel, adjust volume, move an indicator, or move a cursor.

The camera unit 232 may include a lens (not shown) and an image sensor (not shown). The camera unit 232 may support an optical zoom or a digital zoom by using a plurality of lenses and image processing. A recognition range of the camera unit 232 may be variously set based on an angle of a camera and surrounding conditions. When the camera unit 232 includes a plurality of cameras, a 3-dimensional (3D) still image or 3D motion may be received by using the plurality of cameras.

The camera unit 232 may be integrated with or separated from the image display apparatus 200. A separate apparatus (not shown) including the camera unit 232 separated from the image display apparatus 200 may be electrically connected to the image display apparatus 200 through the communicator 250 or the input/output unit 270.

It would be obvious to one of ordinary skill in the art that the camera unit 232 may be excluded based on a performance and a structure of the image display apparatus 200.

An optical receiver 233 receives an optical signal (including a control signal) from an external control apparatus through an optical window (not shown) of a bezel of the display 220. The optical receiver 233 may receive, from the external control apparatus, an optical signal corresponding to a user input, for example, a touch, pressing, a touch gesture, voice, or motion). A control signal may be extracted from the optical signal according to control of the controller 210.

The input/output unit 270 receives video (for example, a moving image), audio (for example, voice or music), and additional information (for example, EPG) from an external source of the image display apparatus 200, according to control of the controller 210. The input/output unit 270 may include one of HDMI port 271, a component jack 272, a PC port 273, and a universal serial bus (USB) port 274. The input/output unit 270 may include a combination of the HDMI port 271, the component jack 272, the PC port 273, and the USB port 274.

It would be obvious to one of ordinary skill in the art that the input/output unit 270 may be excluded based on a performance and a structure of the image display apparatus 200.

The controller 210 controls overall operations of the image display apparatus 200 and a signal flow between the components in the image display apparatus 200, and performs function of processing data. When a user input is received or a pre-set and stored condition is satisfied, the controller 210 may execute an operating system (OS) and various applications stored in the storage unit 290.

The controller 210 may include a random access memory 281 used to store a signal or data received from an external source of the image display apparatus 200 or used as a storage area of various operations performed by the image display apparatus 200, a read-only memory (ROM) 272 in which a control program for controlling the image display apparatus 200 is stored, and a processor 283.

The processor 283 may include a graphics processing unit (GPU) 284 for performing a graphic process on a video. The processor 283 may be realized as a system-on-chip (SoC) in which a core (not shown) and the GPU 284 are integrated.

The GPU 284 generates a screen including various objects, such as an icon, an image, and text, by using an operator (not shown) and a renderer (not shown). The operator calculates an attribute value, such as a coordinate value, a shape, a size, or a color, of each object according to a layout of the screen, by using a user input detected through the detector 230. The renderer generates the screen having any one of various layouts including the objects based on the attribute values calculated by the operator. The screen generated by the renderer is displayed in a display region of the display 220.

First through n-th interfaces 285-1 through 285-n are connected to various components described above. One of the first through n-th interfaces 285-1 through 285-n may be a network interface connected to an external apparatus through a network.

The RAM 281, the ROM 282, the processor 283, the GPU 284, and the first through n-th interfaces 285-1 through 285-n may be connected to each other through an internal bus 286.

The term "controller of an image display apparatus" in the current embodiment includes the processor 283, the ROM 282, and the RAM 281.

The storage unit 290 may store various types of data, programs, or applications for driving and controlling the image display apparatus 200, according to control of the controller 210. The storage unit 290 may store a signal or data input/output according to driving of the video processor 280, the display 220, the audio processor 215, the audio output unit 225, the power supply unit 260, the tuner 240, the communicator 250, the detector 230, and the input/output unit 270. The storage unit 290 may store a control program for controlling the image display apparatus 200 and the controller 210, an application initially provided by a manufacturer or downloaded from an external source, a graphical user interface (GUI) related to the application, an object (for example, an image, text, an icon, or a button) for providing the GUI, user information, a document, databases, or related data.

According to an embodiment, the term "storage unit" includes the storage unit 290, the ROM 282 or the RAM 281 of the controller 210, or a memory card (for example, a micro secure digital (SD) card or a USB memory) provided in the image display apparatus 200. Also, the storage unit 290 may include a non-volatile memory, a volatile memory, a hard disk drive (HDD), or a solid state drive (SSD).

The storage unit 290 may include a broadcast receiving module, a channel control module, a volume control module, a communication control module, a voice recognizing module, a motion recognizing module, a light receiving module, a display control module, an audio control module, an external input control module, a power supply control module, a power supply control module of an external apparatus connected wirelessly (for example, via Bluetooth), a voice database, or a motion database, which is not shown. The module or database of the storage unit 290, which are not shown, may be realized as software to perform a broadcast receiving control function, a channel control function, a volume control function, a communication control function, a voice recognizing function, a motion recognizing function, a light receiving control function, a display control function, an audio control function, an external input control function, a power supply control function, or a power supply control function of the external apparatus connected wirelessly (for example, via Bluetooth). The controller 210 may perform each function by using the software stored in the storage unit 290.

Also, the image display apparatus 200 including the display 220 may be electrically connected to a separate external apparatus including a tuner. For example, the image display apparatus 200 may be realized as an analog TV, a digital TV, a 3D TV, a smart TV, an LED TV, an OLED TV, a plasma TV, or a monitor, but is not limited thereto.

The image display apparatus 200 may include a sensor (for example, an illumination sensor or a temperature sensor) detecting an internal or external state of the image display apparatus 200.

Meanwhile, the image display apparatuses 100 and 200 shown in FIGS. 2 and 3 are only examples, and one or more components of the image display apparatus 100 or 200 may be integrated or omitted, or one or more components may be added to the image display apparatus 100 or 200 based on specifications of the image display apparatus 100 or 200. In other words, at least two components may be combined as one component or one component may be divided into at least two components, if required. Also, functions performed by each block are only for describing one or more embodiments, and detailed operations or apparatuses do not limit the scope of the present disclosure.

Figure 4:
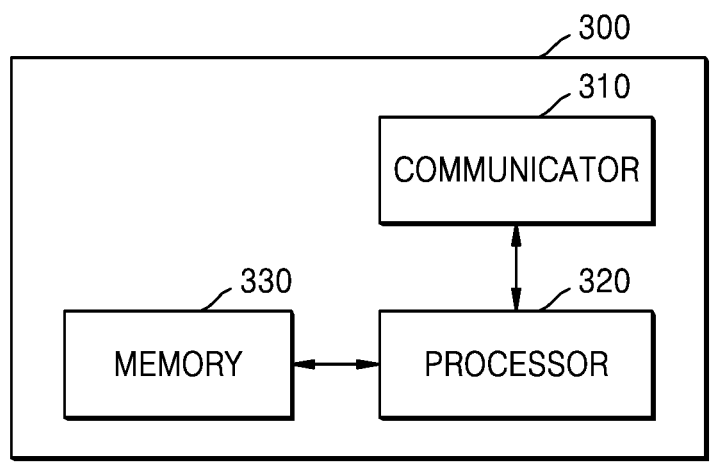
FIG. 4 is a block diagram of a server according to an embodiment.

FIG. 4 is a block diagram of the server 300 according to an embodiment.

Referring to FIG. 4, the server 300 according to an embodiment may include a communicator 310, a processor 320, and a memory 330.

The communicator 310 may communicate with an external apparatus according to control of the processor 320. For example, the communicator 310 may exchange data or signal with a plurality of image display apparatuses, for example, the image display apparatus 100 and the first through third image display apparatuses 51 through 53, according to an embodiment. The communicator 310 may receive frequency band information from the plurality of image display apparatuses and transmit integrated frequency band information to the plurality of image display apparatuses, according to control of the processor 320.

The server 300 may transmit the integrated frequency band information to the image display apparatus 100 when the image display apparatus 100 requests for it. Alternatively, when the integrated frequency band information is updated, the server 300 may transmit the updated integrated frequency band information to the image display apparatus 100. However, an embodiment is not limited thereto.

Also, when a new channel that is not included in integrated frequency band information pre-stored in the server 300 is added, the server 300 may update the integrated frequency band information to include the new channel. Also, when the new channel that is not included in the pre-stored integrated frequency band information is added, the server 300 may request the image display apparatus 100 for a channel scan. Also, the server 300 may transmit frequency band information corresponding to the new channel to the image display apparatus 100.

The processor 320 may control overall operations of the server 300. The processor 320 according to an embodiment may execute at least one program stored in the memory 330. The processor 320 may include a single core, a dual core, a triple core, a quad core, or a multiple core. Also, the processor 320 may include a plurality of processors.

The memory 330 according to an embodiment may store various types of data, programs, or applications for driving and controlling the server 300. A program stored in the memory 330 may include at least one instruction. The program (at least one instruction) or the application stored in the memory 330 may be executed by the processor 320.

The processor 320 may generate integrated frequency band information by integrating pieces of frequency band information received from a plurality of image display apparatuses located in the same region. For example, when first frequency band information received from the first image display apparatus 51 located in a first region includes frequency band corresponding to channels 4, 7, 8, and 11, second frequency band information received from the second image display apparatus 52 located in the first region includes frequency bands corresponding to channels 1, 3, 7, and 12, and third frequency band information received from the third image display apparatus 53 located in the first region includes frequency bands corresponding to channels 1, 7, and 8, the processor 320 may generate integrated frequency band information corresponding to the first region and including frequency bands corresponding to the channels 1, 3, 4, 7, 8, 9, 11, and 12. Also, in the same manner, the processor 320 may generate integrated frequency band information corresponding to a second region different from the first region, by integrating pieces of frequency band information received from a plurality of image display apparatuses located in the second region.

The generated integrated frequency band information may be matched to region information and stored in the memory 330.

Figure 5:
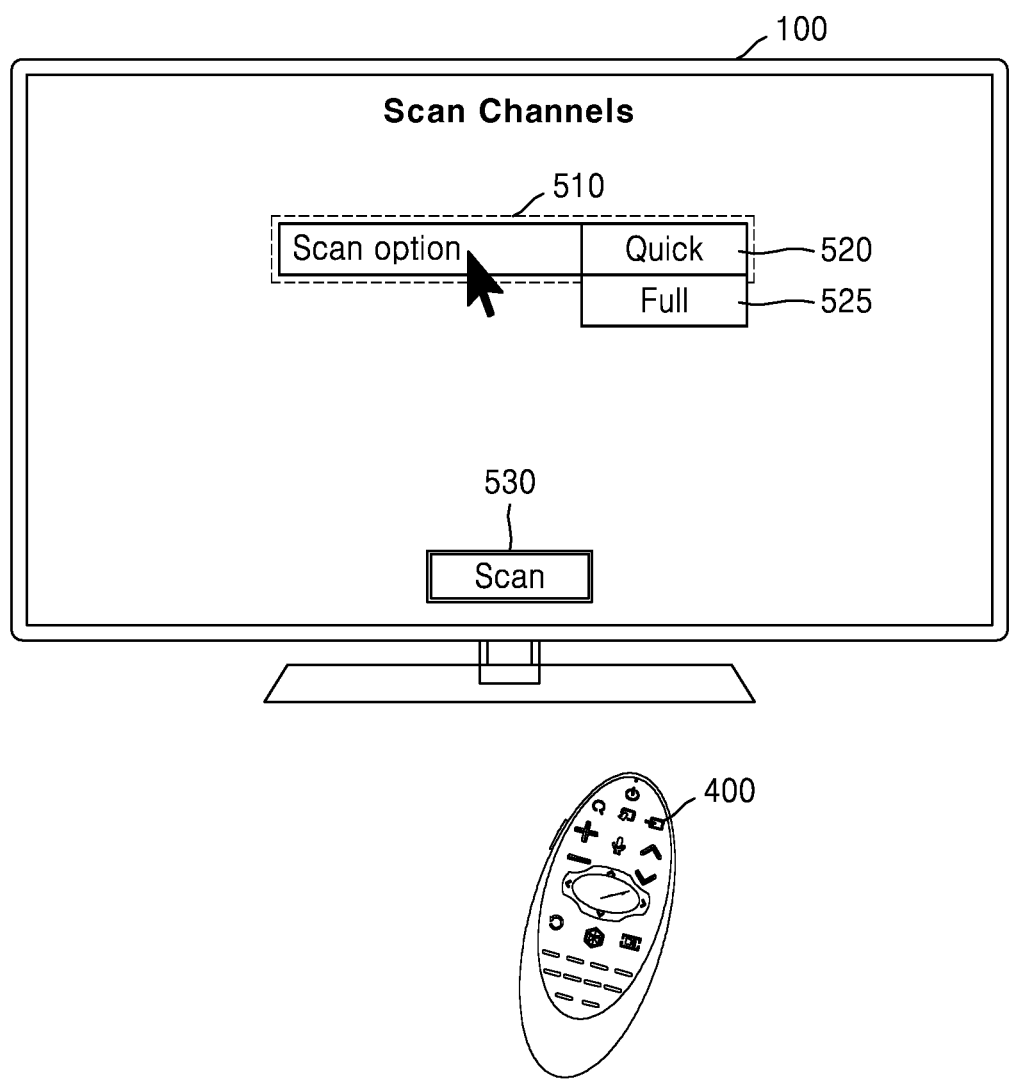
FIG. 5 illustrates a channel scan setting screen in an image display apparatus, according to an embodiment.

FIG. 5 illustrates a channel scan setting screen in an image display apparatus, according to an embodiment.

Referring to FIG. 5, the image display apparatus 100 according to an embodiment may receive a control signal from a control apparatus 400, and control the image display apparatus 100 based on the received control signal.

The control apparatus 400 according to an embodiment may exchange a signal with the image display apparatus 100, according to the IR or RF communication standard, but an embodiment is not limited thereto. Also, the control apparatus 400 may include a user input unit including a keypad, a button, a touch pad, or a touch screen. A user may manipulate the user input unit of the control apparatus 400 to input, to the control apparatus 400, a command related to the image display apparatus 100. For example, when the control apparatus 400 includes a hard key button, the user may perform a pushing operation on the hard key button to input, to the control apparatus 400, a command related to the image display apparatus 100. Alternatively, when the control apparatus 400 includes a touch screen, the user may touch a soft key on the touch screen to input, to the control apparatus 400, a command related to the image display apparatus 200.

A control signal corresponding to a user input may be transmitted to the image display apparatus 100.

For example, the user may input a command for displaying, on the image display apparatus, a setting screen related to an automatic channel scan (hereinafter, referred to as a "channel scan setting screen") by using the user input unit of the control apparatus 400. The control apparatus 400 may transmit a control signal corresponding to a user input, to the image display apparatus 100, and the image display apparatus 100 may display a channel scan setting screen according to the user input. The channel scan setting screen may include an item 510 for setting a channel scan mode, but is not limited thereto.

The image display apparatus 100 may detect a user input of selecting the item 510 included in the channel scan setting screen by using the control apparatus 400. When the item 510 is selected, lower items 520 and 525 including a quick scan mode (Quick) and a general scan mode (Full) are displayed, as shown in FIG. 5. Here, the quick scan mode is a mode of scanning channels in an integrated frequency band received from the server 300, and the general scan mode is a mode of scanning channels in a whole frequency band set in a region where the image display apparatus 100 is located.

When a channel scan mode is set to be any one of the quick scan mode and the general scan mode, and then a user input of selecting a scan button 530 is detected, the image display apparatus 100 may automatically scan channels.

Hereinafter, a method of scanning, by the image display apparatus 100, channels in the quick scan mode will be described with reference to FIGS. 6 and 7, and a method of scanning, by the image display apparatus 100, channels in the general scan mode will be described with reference to FIGS. 8 and 9.

Figure 6:
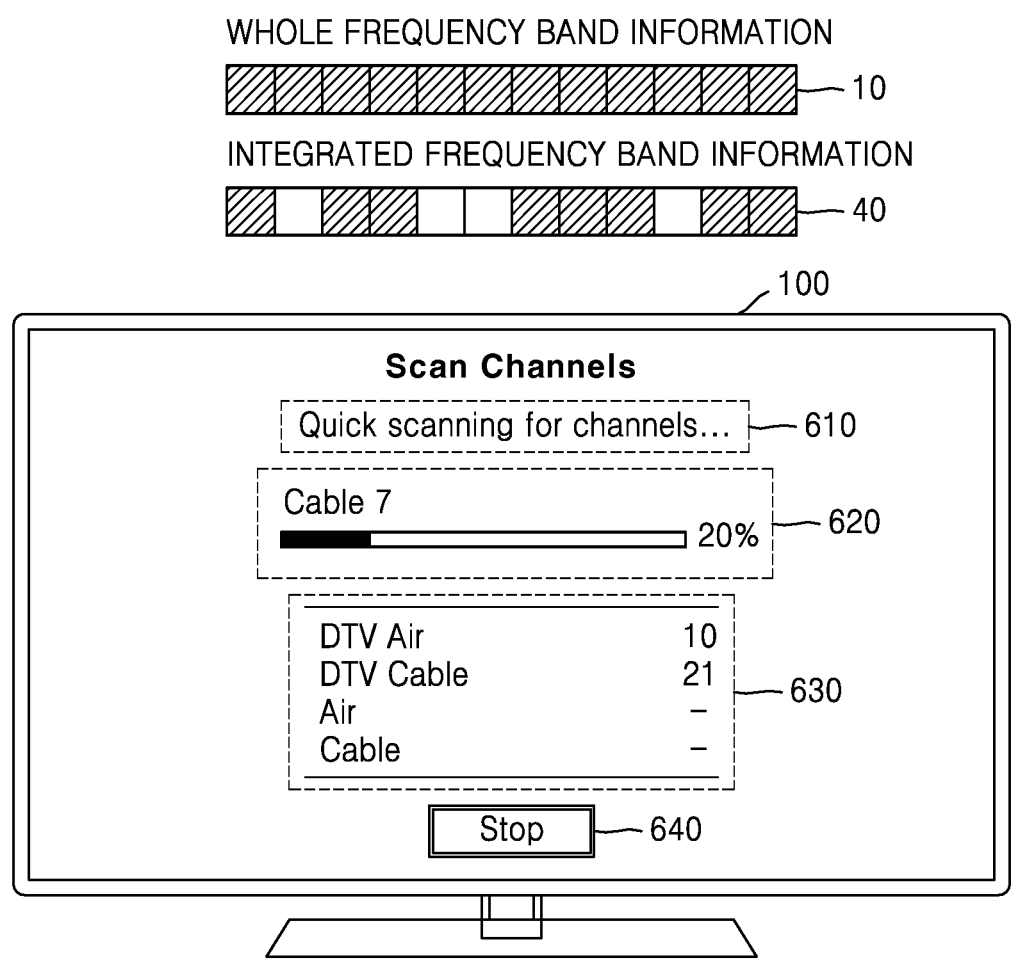
FIGS. 6 and 7 are diagrams for describing a method of scanning, by an image display apparatus, channels in a quick scan mode, according to an embodiment.
Figure 7:
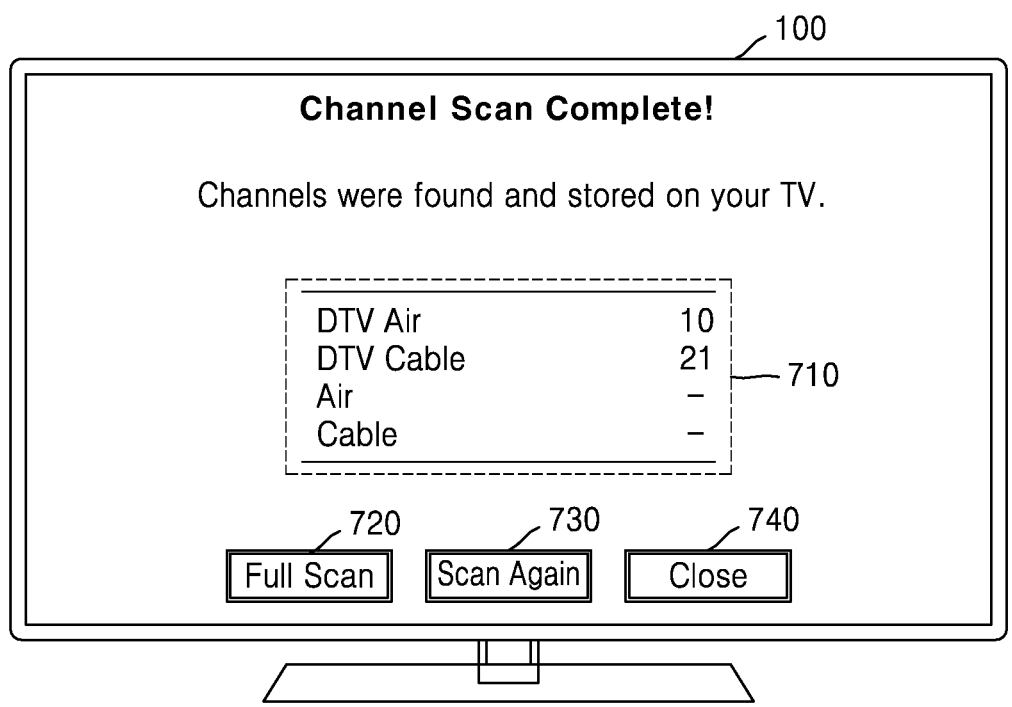

FIGS. 6 and 7 are diagrams for describing a method of scanning, by the image display apparatus 100, channels in a quick scan mode, according to an embodiment.

When a channel scan mode is set to a quick scan mode, the image display apparatus 100 may scan channels by using integrated frequency band information received from the server 300.

For example, as shown in FIG. 6, the whole frequency band 10 set in a region where the image display apparatus 100 is located may include frequency bands corresponding to channels 1 through 12. On the other hand, the integrated frequency band 40 received from the server 300 may include frequency bands corresponding to channels 1, 3, 4, 7, 8, 9, 11, and 12.

When the image display apparatus 100 scans channels in the quick scan mode, the image display apparatus 100 may scan only channels included in the integrated frequency band 40, instead of the whole frequency band 10. For example, the image display apparatus 100 may tune reception frequencies to frequencies respectively corresponding to the channels 1, 3, 4, 7, 8, 9, 11, and 12, and determine whether a broadcast signal is received.

Meanwhile, the integrated frequency band 40 may include a frequency band corresponding to a terrestrial broadcast signal and a frequency band corresponding to a cable broadcast signal. The image display apparatus 100 according to an embodiment may scan the frequency band corresponding to the cable broadcast signal, and then scan the frequency band corresponding to the terrestrial broadcast signal when the scanning of the frequency band corresponding to the cable broadcast signal is completed, but is not limited thereto.

When the number of receivable channels is equal to or higher than a pre-set number based on a result of the scanning of the frequency band corresponding to the cable broadcast signal, the image display apparatus 100 may skip the scanning of the frequency band corresponding to the terrestrial broadcast signal.

When channels are scanned in the quick scan mode, the image display apparatus 100 may display at least one of a message 610 (for example, "Quick scanning for channels") indicating that channels are scanned in the quick scan mode, a graph 620 indicating a progression of a channel scan, and a list 630 of the number of channels that have currently been found. Also, the image display apparatus 100 may also display a stop button 640 for stopping the channel scan.

Meanwhile, when the channel scan is completed, the image display apparatus 100 may display a list 710 of the number of channels that have been found, together with a message that the channel scan is completed, as shown in FIG. 7. Also, the image display apparatus 100 may display a general scan mode button 720. Here, when a user input of selecting the general scan mode button 720 is detected, the image display apparatus 100 may perform a channel scan in the whole frequency band 10.

Also, the image display apparatus 100 may display a re-scan button 730. When a user input of selecting the re-scan button 730 is detected, the image display apparatus 100 may perform the channel scan again in the integrated frequency band 40, in the quick scan mode.

Also, the image display apparatus 100 may display an end button 740. When a user input of selecting the end button 740 is detected, the image display apparatus 100 may end the channel scan and generate a channel map including channels that have been found, but an embodiment is not limited thereto.

Figure 8:
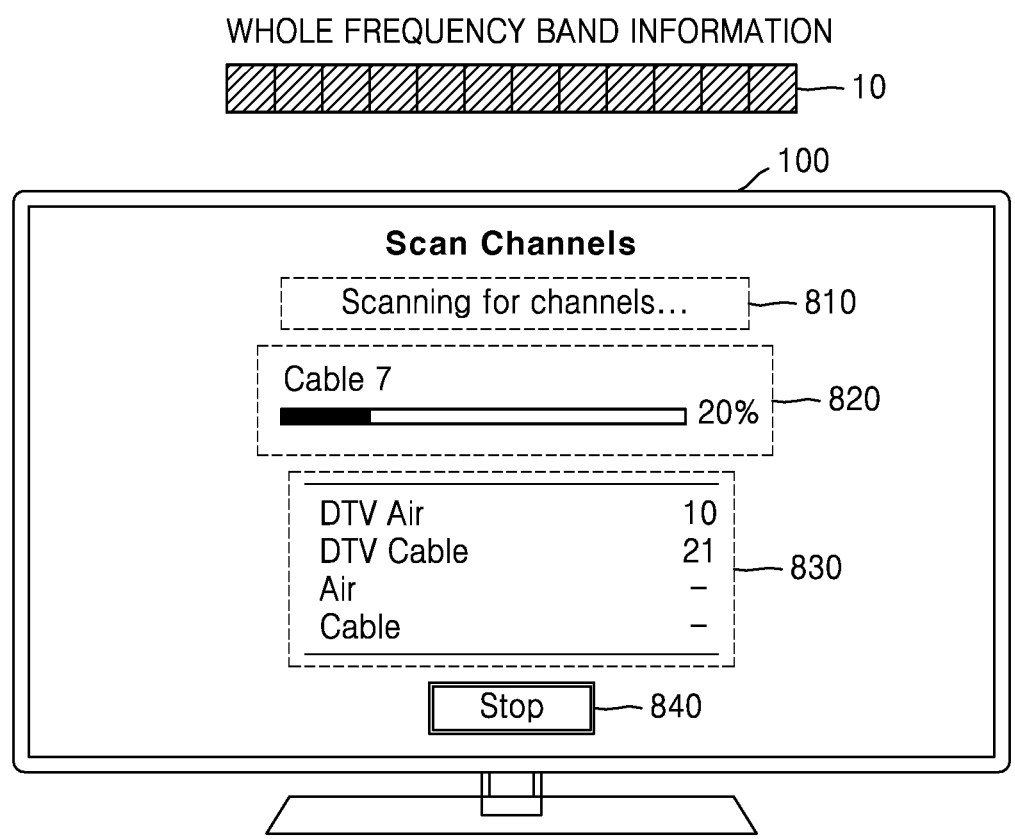
FIGS. 8 and 9 are diagrams for describing a method of scanning, by an image display apparatus, channels in a general scan mode, according to an embodiment.
Figure 9:
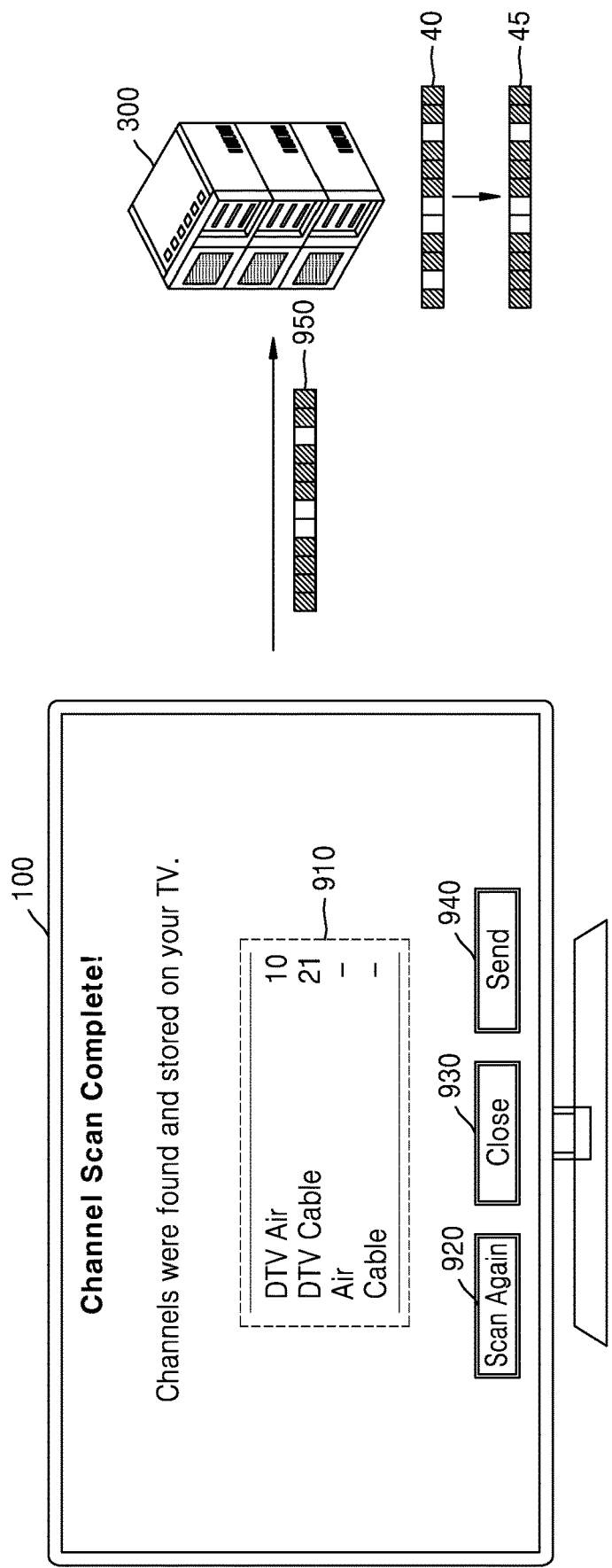

FIGS. 8 and 9 are diagrams for describing a method of scanning, by the image display apparatus 100, channels in a general scan mode, according to an embodiment.

When the channel scan mode is set to a general scan mode, the image display apparatus 100 may scan channels by using the whole frequency band information. For example, as shown in FIG. 8, the whole frequency band 10 set in the region where the image display apparatus 100 is located may include frequency bands corresponding to the channels 1 through 12.

When the image display apparatus 100 scans channels in the general scan mode, the image display apparatus 100 may scan all channels included in the whole frequency band 10. For example, the image display apparatus 100 may tune reception frequencies to frequencies respectively corresponding to the channels 1 through 12, and determine whether a broadcast signal is received in the tuned frequencies.

Meanwhile, the whole frequency band 10 may include a frequency band corresponding to a terrestrial broadcast signal and a frequency band corresponding to a cable broadcast signal. The image display apparatus 100 according to an embodiment may scan the frequency band corresponding to the cable broadcast signal, and scan the frequency band corresponding to the terrestrial broadcast signal when the scanning of the frequency band corresponding to the cable broadcast signal is completed, but an embodiment is not limited thereto.

When the number of receivable channels is equal to or higher than a pre-set number based on a result of the scanning of the frequency band corresponding to the cable broadcast signal, the image display apparatus 100 may skip the scanning of the frequency band corresponding to the terrestrial broadcast signal.

When channels are scanned in the general scan mode, the image display apparatus 100 may display at least one of a message 810 (for example, "Scanning for channels") indicating that channels are scanned in the general scan mode, a graph 820 indicating a progression of a channel scan, and a list 830 of the number of channels that have currently been found. Also, the image display apparatus 100 may also display a stop button 840 for stopping the channel scan.

Meanwhile, when the channel scan is completed in the whole frequency band 10, the image display apparatus 100 may display a list 910 of the number of channels that have been found, together with a message that the channel scan is completed, as shown in FIG. 9.

Also, the image display apparatus 100 may display a re-scan button 920. When a user input of selecting the re-scan button 920 is detected, the image display apparatus 100 may perform the channel scan again in the whole frequency band 10, in the general scan mode.

Also, the image display apparatus 100 may display an end button 930. When a user input of selecting the end button 930 is detected, the image display apparatus 100 may end the channel scan and generate a channel map including channels that have been found, but an embodiment is not limited thereto.

Also, the image display apparatus 100 may display a transmission button 940. When a user input of selecting the transmission button 940 is detected, the image display apparatus 100 may transmit information about frequency bands corresponding to found channels to the server 300. Alternatively, when frequency band information corresponding to found channels and integrated frequency band information received from the server 300 are different from each other, the image display apparatus 100 may automatically transmit the frequency band information corresponding to the found channels to the server 300. Alternatively, the image display apparatus 100 may display the transmission button 940 only when the frequency band information corresponding to the found channels and the integrated frequency band information received from the server 300 are different from each other, but an embodiment is not limited thereto.

Meanwhile, when information about a frequency band 950 is received from the image display apparatus 100, the server 300 may update pre-stored integrated frequency band information based on the received information. For example, when the pre-stored integrated frequency band information includes the integrated frequency band 40 corresponding to the channels 1, 3, 4, 7, 8, 9, 11, and 12, and channels found by the image display apparatus 100 are channels 1 through 4, 7 through 9, 11, and 12, the information received from the image display apparatus 100 may include the frequency band 950 corresponding to the channels 1 through 4, 7 through 9, 11, and 12.

The server 300 may generate a frequency band 45 by integrating the pre-stored integrated frequency band 40 and the frequency band 950. Accordingly, the updated integrated frequency band information may include the frequency band 45 corresponding to the channels 1 through 4, 7 through 9, 11, and 12, but an embodiment is not limited thereto.

Meanwhile, the image display apparatus 100 according to an embodiment may determine the region where the image display apparatus 100 is located based on an IP address set in the image display apparatus 100. Alternatively, the image display apparatus 100 may determine the region where the image display apparatus 100 is located based on a user input (for example, an input of region information about a nation, a city, a town, a province, and a county corresponding to the region where the image display apparatus 100 is located).

The image display apparatus 100 according to an embodiment may scan channels in the general scan mode when the region (a first region) determined based on the IP address set in the image display apparatus 100 and a region (a second region) determined based on the user input are different from each other.

For example, the image display apparatus 100 may scan channels by using the whole frequency band information set in the second region determined based on the user input, or by using the whole frequency band information set in the first region determined based on the IP address. Alternatively, the image display apparatus 100 may compare the whole frequency band information set in the first region (first whole frequency band information) and the whole frequency band information set in the second region (second whole frequency band information), and scan channels by using whole frequency band information having wide frequency bands. Alternatively, the image display apparatus 100 may scan channels by using frequency band information including the first whole frequency band information and the second whole frequency band information.

Figure 10:
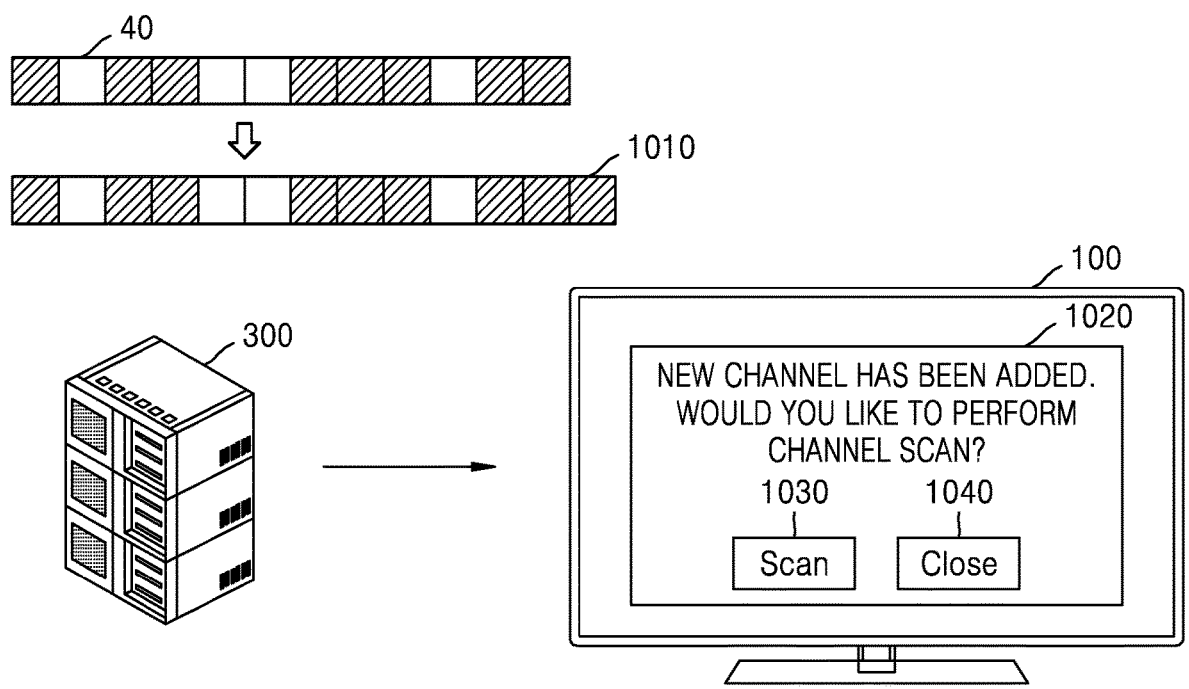
FIG. 10 is a diagram for describing a method of operating a server and an image display apparatus, when a new channel is added to the server or when integrated frequency band information is updated in the server, according to an embodiment.

FIG. 10 is a diagram for describing a method of operating the server 300 and the image display apparatus 100, when a new channel is added to the server 300 or when integrated frequency band information is updated in the server 300, according to an embodiment.

Referring to FIG. 10, a new channel may be added to the server 300 according to an embodiment. For example, when the integrated frequency band 40 included in the integrated frequency band information pre-stored in the server 300 includes the channels 1, 3, 4, 7, 8, 9, 11, and 12, a new channel 13 1010 may be added to the server 300. Here, the server 300 may update the integrated frequency band information to include the channel 13 1010.

Also, when a new channel that is not included in the pre-stored integrated frequency band information is added, the server 300 may request the image display apparatus 100 to perform a channel scan. Also, the server 300 may transmit frequency band information corresponding to the new channel to the image display apparatus 100.

Upon receiving a channel scan request from the server 300, the image display apparatus 100 may display a message 1020 indicating that a new channel has been added, and display a channel scan button 1030 and an end button 1040.

When a user input of selecting the channel scan button 1030 is detected, the image display apparatus 100 may perform a channel scan by using frequency band information including the new channel. For example, the image display apparatus 100 may display the channel scan setting screen as described above with reference to FIG. 5, and perform the channel scan in the general scan mode or the quick scan mode. When the channel scan is performed in the general scan mode, the image display apparatus 100 may perform the channel scan by using the whole frequency band information including the frequency band corresponding to the new channel. Also, when the channel scan is performed in the quick scan mode, the image display apparatus 100 may receive updated integrated frequency band information (including the frequency band corresponding to the new channel), and perform the channel scan by using the updated integrated frequency band information.

Alternatively, when the frequency band information corresponding to the new channel is received from the server 300, the image display apparatus 100 adds the new channel (for example, the channel 13 1010) by performing a background channel scan without having to receive a user input.

Figure 11:
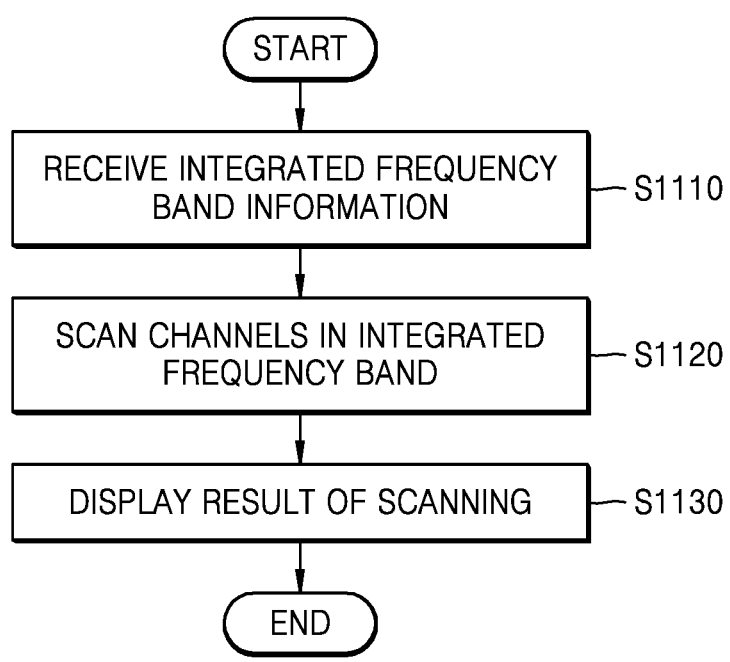
FIG. 11 is a flowchart of a method of operating an image display apparatus, according to an embodiment.

FIG. 11 is a flowchart of a method of operating the image display apparatus 100, according to an embodiment.

Referring to FIG. 11, the image display apparatus 100 according to an embodiment may receive, from the server 300, integrated frequency band information corresponding to a region where the image display apparatus 100 is located, in operation S1110.

The integrated frequency band information may be frequency information generated based on frequency band information corresponding to channels receivable by each of a plurality of image display apparatuses located in the same region.

For example, the server 300 may generate integrated frequency band information by integrating pieces of frequency band information corresponding to channels receivable by the first through third image display apparatuses 51 through 53 located in the same region as the image display apparatus 100, and store the generated integrated frequency band information.

The server 300 may transmit the integrated frequency band information to the image display apparatus 100 when the image display apparatus 100 requests for it. Alternatively, when the integrated frequency band information is updated, the server 300 may transmit the updated integrated frequency band information to the image display apparatus 100, but an embodiment is not limited thereto.

The image display apparatus 100 may scan channels included in an integrated frequency band for a channel receivable by the image display apparatus 100, in operation S1120.

For example, when a whole frequency band set in the region where the image display apparatus 100 is located includes frequency bands corresponding to channels 1 through 12, and the integrated frequency band received from the server 300 includes frequency bands corresponding to channels 1, 3, 4, 7, 8, 9, 11, and 12, the image display apparatus 100 may not scan all of the channels 1 through 12, but may scan the channels 1, 3, 4, 7, 8, 9, 11, and 12 for a receivable channel. The image display apparatus 100 may tune reception frequencies to frequencies respectively corresponding to channels 1, 3, 4, 7, 8, 9, 11, and 12, and determine whether a broadcast signal is received.

The image display apparatus 100 may display a result of the scanning, in operation S1130.

When the channel scan is completed, the image display apparatus 100 may display a list of the number of found channels together with a message indicating that the channel scan is completed. Also, the image display apparatus 100 may generate a channel map including the found channels when the channel scan is completed. However, an embodiment is not limited thereto.

A server according to an embodiment may provide an integrated frequency band including only actually valid frequency bands according to regions.

An image display apparatus according to an embodiment may reduce a channel scan time by performing a channel scan based on the integrated frequency band. Accordingly, user convenience may be increased.

The methods described above may be recorded on a computer-readable recording medium by being realized in computer programs executed by using various computers. The computer-readable recording medium may include at least one of a program command, a data file, and a data structure. The program commands recorded in the computer-readable recording medium may be specially designed or well known to one of ordinary skill in the computer software field. Examples of the computer-readable recording medium include ROM, RAM, CD-ROMs, magnetic tapes, floppy disks, optical data storage devices, etc. Examples of the computer command include mechanical codes prepared by a compiler, and high-level languages executable by a computer by using an interpreter.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An image display apparatus comprising:
    a communicator configured to communicate with a server;
    a tuner configured to receive a broadcast signal;
    a display; and
    a processor; and
    a memory storing instructions that, when executed by the processor, cause the image display apparatus to:
        transmit, to the server via the communicator, location information corresponding to a region where the image display apparatus is located,
        receive, from the server via the communicator, information on a plurality of frequency bands with respect to a broadcast signal source which correspond to the transmitted location information, and
        subsequent to the information on the plurality of frequency bands being received from the server:
            based on a user input received through a user interface, select one of a first channel scanning mode for performing a channel scan with respect to the broadcast signal source using the plurality of frequency bands and a second channel scanning mode for performing the channel scan with respect to the broadcast signal source using a whole frequency band corresponding to the broadcast signal source, wherein the whole frequency band includes the plurality of frequency bands and is wider than the plurality of frequency bands,
            perform a channel scan with respect to the broadcast signal source according to the selected one of the first channel scanning mode and the second channel scanning mode so that,
                when the first channel scanning mode is selected, the channel scan is performed with respect to the broadcast signal source using the plurality of frequency bands, but not the whole frequency band, and,
                when the second channel scanning mode is selected, the channel scan is performed with respect to the broadcast signal source using the whole frequency band, and
            store, in the memory, information indicating channels found through the channel scan,
        wherein, when the location information is transmitted to the server, the image display apparatus is not performing a channel scan according to the first channel scanning mode or the second channel scanning mode.

2. The image display apparatus of claim 1, wherein the instructions further comprise instructions that, when executed by the processor, cause the image display apparatus to:
    display a user interface for performing the channel scan according to the second channel scanning mode, when the selected channel scanning mode is the first channel scanning mode and the channel scan according to the first channel scanning mode is completed.

3. The image display apparatus of claim 1, wherein the instructions further comprise instructions that, when executed by the processor, cause the image display apparatus to:
    display, on the display, a channel scan setting screen for selecting any one of the first channel scanning mode and the second channel scanning mode.

4. The image display apparatus of claim 3, wherein the plurality of frequency bands are included in an integrated frequency band with respect to a plurality of broadcast signal sources including frequency bands corresponding to channels actually receivable through the plurality of broadcast signal sources by other image display apparatuses located in the same region as the image display apparatus.

5. The image display apparatus of claim 3, wherein the instructions further comprise instructions that, when executed by the processor, cause the image display apparatus to:

control the tuner to scan the broadcast signal through the whole frequency band corresponding to the broadcast signal source to thereby find channels receivable by the image display apparatus, when a user input of selecting the second channel scanning mode is detected.

6. The image display apparatus of claim 1, wherein the instructions further comprise instructions that, when executed by the processor, cause the image display apparatus to:

display a user interface for transmitting, to the server, information about a frequency band corresponding to channels found through the channel scan according to the second channel scanning mode, when the selected channel scanning mode is the second channel scanning mode and the channel scan according to the second channel scanning mode is completed.

7. The image display apparatus of claim 6, wherein the instructions further comprise instructions that, when executed by the processor, cause the image display apparatus to:

transmit, to the server, information about frequency bands corresponding to channels receivable by the image display apparatus, when the plurality of frequency bands do not match the frequency bands corresponding to the channels receivable by the image display apparatus.

8. The image display apparatus of claim 1, wherein the broadcast signal source is a terrestrial broadcast or a cable broadcast.

9. The image display apparatus of claim 8, wherein the instructions further comprise instructions that, when executed by the processor, cause the image display apparatus to:

perform the channel scan based on first frequency bands corresponding to the terrestrial broadcast, and perform the channel scan based on second frequency bands corresponding to the cable broadcast when the channel scanning based on the first frequency bands is completed.

10. A method comprising:
by an image display apparatus:
transmitting, to a server via a communicator, location information corresponding to a region where the image display apparatus is located;
receiving, from the server via the communicator, information on a plurality of frequency bands with respect to a broadcast signal source which correspond to the transmitted location information; and
subsequent to the information on the plurality of frequency bands being received from the server:
based on a user input received through a user interface, selecting one of a first channel scanning mode for performing a channel scan with respect to the broadcast signal source using the plurality of frequency bands and a second channel scanning mode for performing the channel scan with respect to the broadcast signal source using a whole frequency band corresponding to the broadcast signal source, wherein the whole frequency band includes the plurality of frequency bands and is wider than the plurality of frequency bands,
performing a channel scan according to the selected one of the first channel scanning mode and the second channel scanning mode so that,
when the first channel scanning mode is selected, the channel scan is performed with respect to the broadcast signal source using the plurality of frequency bands, but not the whole frequency band, and,
when the second channel scanning mode is selected, the channel scan is performed with respect to the broadcast signal source using the whole frequency band, and
storing, in a memory of the image display apparatus, information indicating channels found through the channel scan,
wherein, when the location information is transmitted to the server, the image display apparatus is not performing a channel scan according to the first channel scanning mode or the second channel scanning mode.

11. The method of claim 10, further comprising:
by the image display apparatus:
displaying a user interface for performing the channel scan according to the second channel scanning mode, when the selected channel scanning mode is the first channel scanning mode and the channel scan according to the first channel scanning mode is completed.

12. The method of claim 10, further comprising:
by the image display apparatus:
displaying, on the image display apparatus, a channel scan setting screen for selecting any one of the first channel scanning mode and the second channel scanning mode.

13. The method of claim 12, wherein the plurality of frequency bands are included in an integrated frequency band with respect to a plurality of broadcast signal sources including frequency bands corresponding to channels actually receivable through the plurality of broadcast signal sources by other image display apparatuses located in the same region as the image display apparatus.

14. The method of claim 12, further comprising:
by the image display apparatus:
scanning the broadcast signal through the whole frequency band corresponding to the broadcast signal source to thereby find channels receivable by the image display apparatus, when a user input of selecting the second channel scanning mode is received.

15. The method of claim 10, further comprising:
by the image display apparatus:
transmitting, to the server, information about a frequency band corresponding to channels found through the channel scan according to the second channel scanning mode, when the selected channel scanning mode is the second channel scanning mode and the channel scan according to the second channel scanning mode is completed.

16. The method of claim 15, wherein the transmitting comprises transmitting, to the server, the information about the frequency band corresponding to channels found through the channel scan when the plurality of frequency bands do not match the frequency band corresponding to channels found through the channel scan.

17. The method of claim 10, wherein
the broadcast signal source is a terrestrial broadcast or a cable broadcast.

18. The method of claim 17, wherein
the performing the channel scan comprises:

performing the channel scan based on first frequency bands corresponding to the terrestrial broadcast, and performing the channel scan based on second frequency bands corresponding to the cable broadcast when the channel scanning based on the first frequency bands is completed.

* * * * *